J. SCHOFIELD.
CLEVIS.
No. 172,180. Patented Jan. 11, 1876.
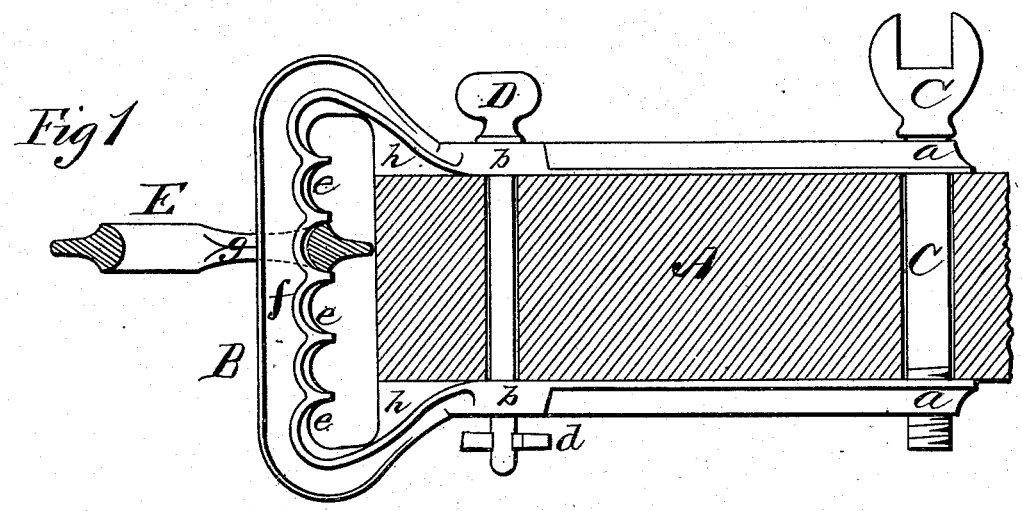
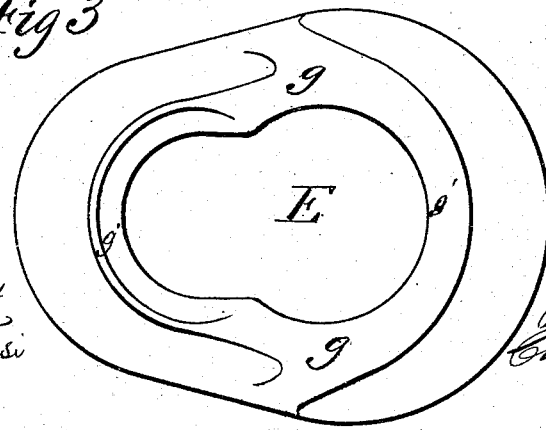
WITNESSES
Robert Everett
Walter C. Mast
INVENTOR
John Schofield
Chipman & Frunr & Co.
ATTORNEYS

UNITED STATES PATENT OFFICE.

JOHN SCHOFIELD, OF MOLINE, ILLINOIS.

IMPROVEMENT IN CLEVISES.

Specification forming part of Letters Patent No. 172,180, dated January 11, 1876; application filed November 6, 1875.

*To all whom it may concern:*

Be it known that I, JOHN SCHOFIELD, of Moline, in the county of Rock Island and State of Illinois, have invented a new and valuable Improvement in Plow-Clevis; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a section of my clevis. Fig. 2 is a plan view of the same. Fig. 3 is a detail view.

This invention has relation to improvements in clevises for plows, cultivators, planters, and other like agricultural implements, wherein a vertical adjustment thereof is desirable.

The object of the invention and improvement is to produce a clevis attachment which may be adjusted for different heights of draft quickly and without detaching the link from the clevis. To this end the nature of the invention consists in combining, with a clevis having adjusting-notches upon its inner front edge, an oblong link, which, when it is in position for drawing, will be held to its engagement with a notch in the clevis, but which, when turned at right angles to its former position, is capable of vertical adjustment without being detached from the clevis, as will be hereinafter more fully explained.

In the annexed drawings, the letter A designates a plow-beam, in connection with which I propose to illustrate my invention. This beam is provided upon its front end with a stirrup-shaped metallic strap or clevis, B, which has horizontal vibration in relation to the beam, and is attached thereto by means of a wrench-bolt, C, passing through eyes $a$, formed in the ends of the clevis, and a vertical perforation in the beam. By this means the said clevis is allowed to vibrate horizontally into a position oblique to the length of the beam for the purpose of "landing" the plow; and, in order that an adjustment for this purpose may be maintained, the shank of the clevis is provided with an enlargement, $b$, above and below the beam, through which are cut, in the arc of a circle, a number of spaced perforations, $c$, any one of which may be made to register with a vertical perforation in the plow-beam, thus allowing a retaining-bolt, D, to be passed through the said perforations and hold the clevis to its adjustment. Bolt D, in practice, will be prevented from casual displacement by means of a spring-key, $d$, passing through a slot in the projecting lower end thereof. As shown in Fig. 2, clevis B is provided with circular notches $e$ upon the inner edge of its vertical bar $f$, and it carries, permanently, a link, E, made of any suitable metal. This link is nearly of oval form, and it is provided upon each of its long sides with a narrowed portion, $g$, of less thickness than the remainder of the link, the object of which will hereinafter appear. When this link is in position for drawing—that is to say, when it is engaged in one of the notches $e$—its extreme end will abut against the end of the beam A, and the said link will be held to its engagement with the said notch, but will be allowed to have free horizontal and vertical vibration therein. Consequently it will be unable to escape from the said notch, even though the team should be stopped.

Should a vertical adjustment be requisite to suit the team, or for other reasons, the link will be turned at right angles to its former position, until its narrow portion is between the notched edge of the clevis and the end of the beam, when, by raising the link, it will escape from the notch, and be allowed to fall into a lower one, when, by turning the said link with its long axis in line with the plow-beam, it will be held to the adjustment thus obtained.

To adjust the link upward the outer end of the link may be lowered, when it may be thrust up and locked, as above described.

In order that this lock may be maintained and the plow be at the same time landed, the front end of the beam is curved, as shown in Fig. 2. This curvature is laid off with a radius equal to the distance from the central or axial line of the wrench-screw to the end of the beam, where the curvature of the link and of the beam are tangential to each other. Consequently, whatever be the position of the clevis, the link will, at all times, be locked to its adjustment, and is capable of being adjusted higher or lower, as above described.

That portion of the clevis above and below the beam is provided with a vertical flange, $h$, the front edge of which is flush with that of the beam, thus securing a lock for the link when the latter is engaged in the upper or lower notches $e$ of the said clevis.

What I claim, and desire to secure by Letters Patent, is—

The oblong link E, having graduated annular flanges $g'$ and a narrowed portion, $g$, in combination with a notched clevis and plow-beam, substantially as specified.

In testimony that I claim the above I have hereunto subscribed my name in the presence of two witnesses.

JOHN SCHOFIELD.

Witnesses:
  H. H. GROVER,
  W. H. RICHARDS.